J. BECKER.
FOCUSING CAMERA.
APPLICATION FILED APR. 3, 1916.

1,319,749.

Patented Oct. 28, 1919.
2 SHEETS—SHEET 1.

Witnesses

Inventor
Joseph Becker

J. BECKER.
FOCUSING CAMERA.
APPLICATION FILED APR. 3, 1916.
1,319,749.
Patented Oct. 28, 1919.
2 SHEETS—SHEET 2.
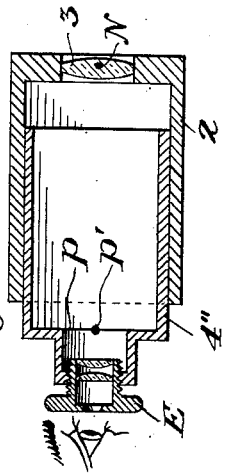
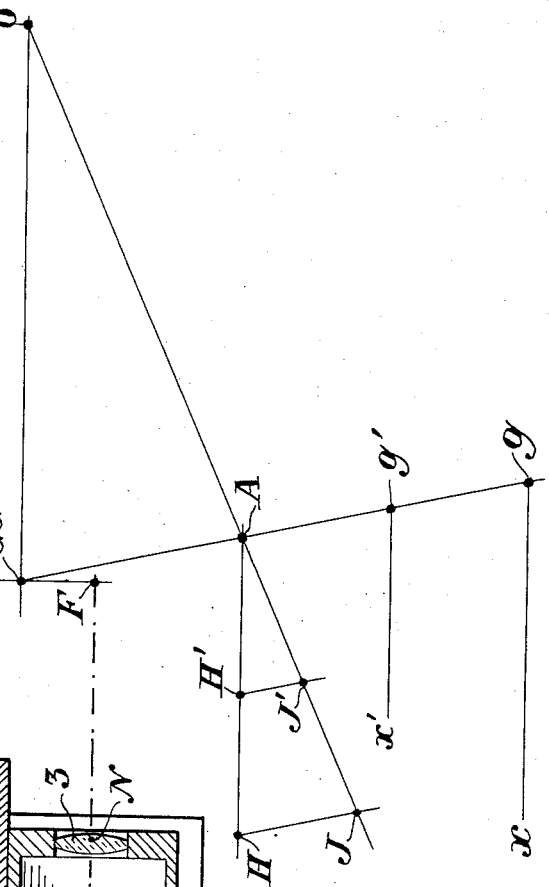
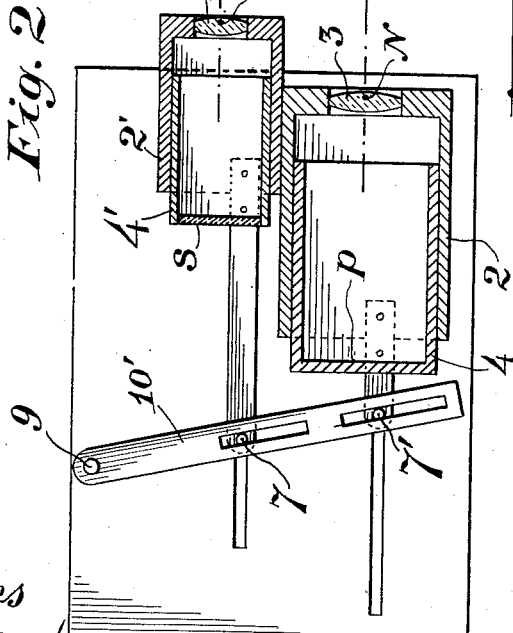
Witnesses
Inventor
Joseph Becker

UNITED STATES PATENT OFFICE.

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

FOCUSING-CAMERA.

1,319,749.   Specification of Letters Patent.   Patented Oct. 28, 1919.

Application filed April 3, 1916. Serial No. 88,749.

*To all whom it may concern:*

Be it known that I, JOSEPH BECKER, a citizen of the United States, residing at Washington, in the District of Columbia, have invented a new and useful Improvement in Focusing-Cameras, of which the following is a specification.

The present patent application, identified for convenience of reference in my related applications and patents as Case Aj or I'', relates to all those parts of my Case I, Serial No. 211,452, filed June 7, 1904, which have not been merged in my Case Af or I', Serial No. 76,423, filed February 5, 1916 now Patent 1,178,478, issued April 4, 1916.

My present invention, therefore, relates to two-lens cameras having lenses of either equal or unequal focal length and mounted in a fixed relative position, with their principal axes parallel and the line joining their external principal foci non-perpendicular to the said principal axes.

My invention is based on a certain form of graph A$gg'$ which is drawn according to rules that are sufficiently general to include, as a special case, any camera claimed in my said Case Af.

The relatively movable image receiving planes of such a camera must be connected by mechanism of the varying velocity ratio type, and I have discovered that this mechanism in its simplest form consists in two radial cams mounted on the same pivot and connected to turn simultaneously in a constant angular relation whose angular value is mainly dependent upon the linear value of the constant distance that separates the two external principal focal planes of the two lenses.

In the special case where these external principal focal planes are coincident the constant angular relation of the two radial cams is zero and the varying velocity ratio mechanism becomes a constant velocity ratio mechanism, as in my said Case Af.

In the accompanying drawings: Figure 1 is a sectional plan of a two-lens camera requiring a varying velocity ratio mechanism, the graph A$gg'$ that was used to plot such mechanism being shown in and as forming part of the figure.

Fig. 2 is a view in every respect similar to Fig. 1, but showing how the use of the same graph A$gg'$ of Fig. 1 may occasionally produce mechanisms whose velocity ratio is constant, as in my said Case Af.

Fig. 3 is a longitudinal section of a telescopic form of the eye camera which is adapted for use either in Fig. 1 or in Fig. 2.

Figure 1:
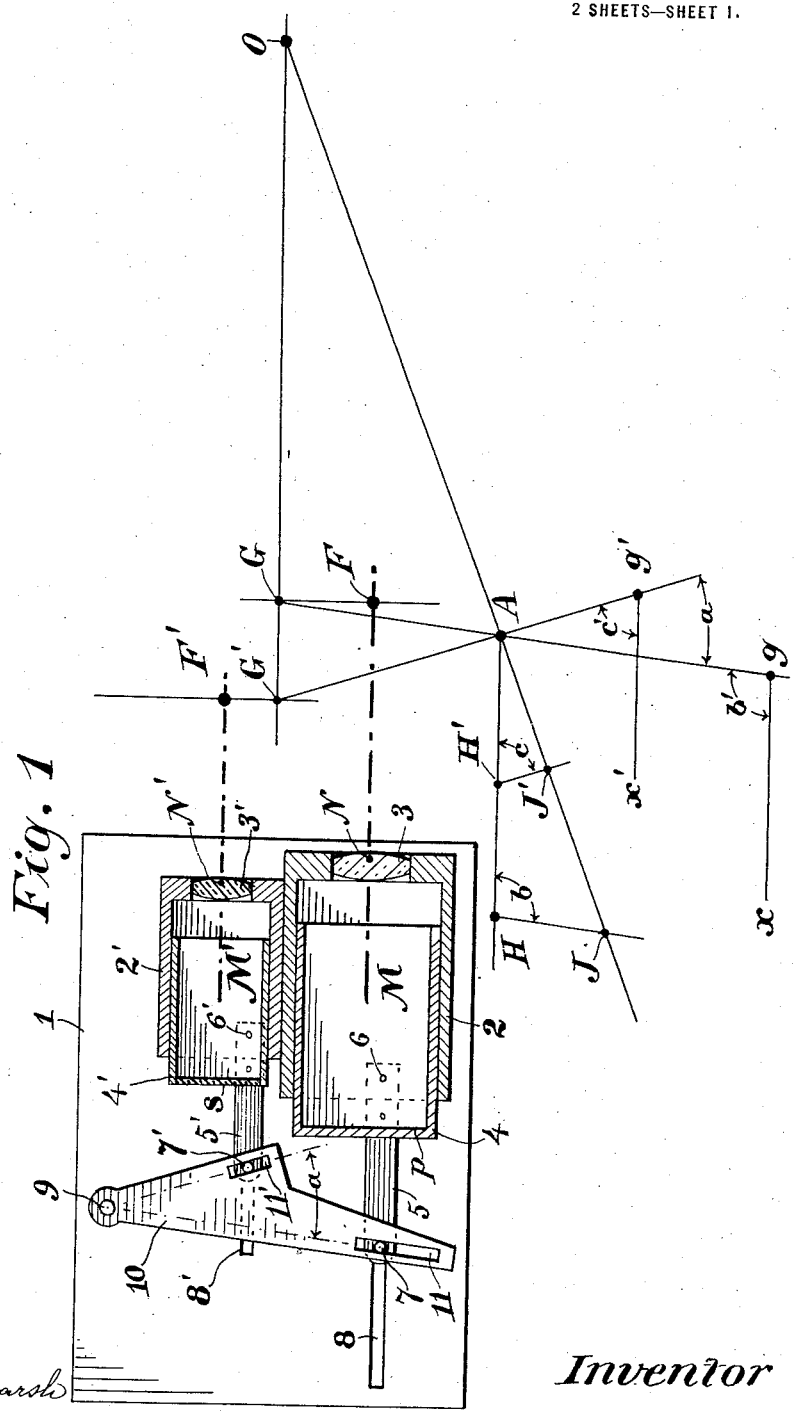

In Fig. 1, 1 is a table or bed serving as a foundation for the cameras, the guides, and the connecting gear. M is the main or exposing camera. M' is the auxiliary or eye camera, which is here made smaller than the exposing camera.

The exposing camera M comprises a box 2 which is fastened to the table and which carries the lens 3. A smaller box 4 adapted to telescope in box 2 carries the plate or film in plane marked $p$. An arm 5 connected to 4 by rivets 6 carries at its rear end a round pin 7 which passes down through a slot 8 in table 1. Slot 8 serves merely as a steadying guide for pin 7.

The eye camera M' has corresponding parts 2', 3', 4', 5', 6', 7', 8', and carries a ground glass screen $s$ used for focusing.

On bed 1 is rigidly fixed a stud 9 on which is pivoted a sector 10. The sector has near one edge a radial slot 11 which engages pin 7 and near the opposite edge it has a second radial slot 11' which similarly engages pin 7'. By turning the sector 10 on its pivot 9 the boxes 4 and 4' are simultaneously moved in and out so that, when screen $s$ shows a sharp picture of an object point I, the same object point will be sharply in focus on the plate or film $p$ and the exposure can be made forthwith. If the radial slots 11 and 11' were alined on the same radius, the sector 10 would be a plain lever and the simultaneous displacements of the two pins 7, 7' would be strictly proportional or in constant ratio. But these slots are in radii that form an angle $a$ and, therefore, the simultaneous displacements are not in constant ratio, and the law of variation is jointly dependent upon the value of angle $a$ and the arrangement of pintles 7, 9, 7'. I will now explain how these may be plotted. The two cameras are first drawn as in the figure, both in focus on infinity. The nodal points N and N' of the incident rays and the outside foci F and F' are plotted. F and F' are the principal foci for parallel rays coming from the left. The focal length of lens 3 is, therefore, NF and the focal length of lens 3' is N'F'. Draw the focal planes through F and F' and then draw any line GG' perpendicular to these planes.

Now, noting that the larger camera is below, select a point A anywhere below line GG'. To secure the best angles, preferably select A close by or, better still, between the focal planes. A triangle AGG' is thus formed. Side AG', which corresponds to the eye camera M', is extended below A a distance A$g'$ such that the product of AG by A$g'$ is equivalent to the square (NF×NF) of the focal length N'F'. Similarly, side GA, corresponding to the exposing camera M, is extended downwardly to A$g$ so that the product of AG by A$g$ is equivalent to the square of the focus NF. Through $g$ and $g'$ draw $gx$ and $g'x'$ perpendicular to the focal planes. Then, the cameras being in focus on infinity, A, $g$, and $g'$ represent the exact relative position of the three pintles 9, 7, and 7', and the respective paths of pintles 7 and 7' are indicated by $gx$ and $g'x'$. I shall now prove that the mechanism so constructed is mathematically accurate. Drawing AH perpendicular to the focal planes, carry thereon the lengths AH=A$g$ and AH'=A$g'$. Through H draw HJ parallel with AG, and through H' draw H'J' parallel with AG'. Now, if a line be drawn from any object point O of line GG' through A, it will determine elements HJ and H'J', which (as shown in Fig. 1 my prior application Case A, now Patent 1,178,474 issued April 4, 1916) represent in actual size what I have called "image distances." That is, HJ is the amount by which camera M must be extended to be on focus on O, and H'J' is the amount by which camera M' must be extended to be in focus on the same object point O. That is to say, line AJ pivoted on A will sweep corresponding image distances on paths HJ and H'J'. Now, angle $b$, being equal to $b'$, A$g$, turning at equal rate, would sweep image distances for camera M on path $gx$; and similarly angle $c$, being equal to $c'$, A$g'$ turning at the same rate, could sweep image distances for camera M' on path $g'x'$. As A$g$ and A$g'$ would thus turn at the same rate, the angle $a$ formed by them would remain constant and, therefore, the sides of a fixed sector $g$A$g'$ will sweep correct image distances on paths $gx$ and $g'x'$. It should be noted that in my said prior application, Case A, the point that corresponds to point A becomes a real pivot in the structure and must, therefore, be selected where it can be supported on the camera, whereas point A here is used merely for plotting purposes and can, therefore, be placed anywhere, even in empty space, as shown in the figure. The detailed process of plotting just given involves the determination of points N, F, N', and F'. But, having once plotted the mechanism for a certain type of camera, the parts can all be made as in the drawing and any slight departures in focal lengths can then be allowed for in assembling the parts by properly placing pin 9. Thus suppose the camera all completed except as to the setting of pin 9. The cameras are first set in focus on infinity, and their drawers 4, 4' are temporarily clamped in such position so that the pins 7, 7' may temporarily be treated as fixed pins. If now sector 10, with its pivot 9 not yet mounted, has its radial slots 11, 11' engaged respectively with the said temporarily fixed pins 7, 7', it will be free to slide around on said pins. Its motion, however, will be definite, for in accordance with a known theorem of geometry its pivot bearing 9 will be constrained to move along an arc of the circle described through pins 7, 7' and any one given position of the bearing 9. Hence this circular arc can be traced by passing a pencil through the apex bearing of the sector. Both cameras are then set and temporarily clamped in focus on a close point O, and the sector is again used as just described to trace a second arc of a circle which will intersect the first arc in the point where the fulcrum pivot should be placed and fixed. The device then generally operates as an approximately accurate focuser having only two-point correspondence; and it can only yield all-point correspondence when the sector angle $a$ happens to be the one required for the given combination.

Thus the sector of Fig. 1, unmounted, and then used to trace arcs, with its bearing 9, for more than two different distances of the object point O, would produce arcs all passing through the shown position of pivot 9, and the device would therefore yield all-point correspondence.

On the other hand, if the sector of Fig. 1, with its finite angle $a$ were similarly used on the pintles 7, 7' of Fig. 2, where the combination requires, as will presently appear, a sector angle $a$ that is equal to zero, the third and all subsequent arcs so traced would all miss the intersection of the first two arcs, and therefore not more than 2-point correspondence could be obtained.

The form of two-lens camera selected for illustration, is one in which the camera elements and the mechanism proper are widely separated to form a combination that is comprehensible, at a glance, in all its parts. No attempt has been made to show the easily derivable and practically more useful compact arrangements.

It will be seen that the value of angle $a$ and the relative position of the pivot 9 and the parallel paths of pins 7 and 7' depend solely upon the shape and size of triangle AGG' and that this triangle can be varied at will to derive forms best adapted to satisfy the requirements of any given case. An illustration of this follows.

The mechanism of Fig. 1 is clearly a varying-velocity-ratio mechanism. But, as already explained, it might become a constant-velocity-ratio mechanism if angle $a$ were reduced to zero. This can be done, as in Fig. 2, by shifting camera M' forwardly to the right on camera M until the focal plane F'G' falls in with focal plane FG. Lines AG and AG' then overlap and angle $a$ vanishes so that the sector then becomes a plain lever 10' or constant-velocity-ratio mechanism, the velocity ratio being equal to the square of the ratio of the focal lengths NF and N'F'. This is proved by noting that, in accordance with the directions given above for plotting A$g$ and A$g'$ we must have $$Ag = \frac{NF.NF}{AG} \quad \quad \quad (1)$$

also $$Ag' = \frac{N'F'.N'F'}{AG'} \quad \quad \quad (2)$$

whence, by division $$\frac{Ag}{Ag'} = \frac{NF.NF}{N'F'.N'F'} \cdot \frac{AG'}{AG} \quad \quad (3)$$

and this equation 3, applied in Fig. 2 where AG equals AG', assumes the much simpler form $$\frac{Ag}{Ag'} = \frac{NF}{N'F'} \cdot \frac{NF}{N'F'} \quad \quad (4)$$

That is to say, in the special case of Fig. 2, the ratio A$g$/A$g'$ of the two lever arms in their initial position A$gg'$ (which is, moreover, identical with the here constant velocity ratio of the pintles 7 and 7') is equal to the focal ratio squared, exactly as in my said Case Af.

A constant-velocity-ratio can only be used when the outside focal planes are in coincidence. This condition must be satisfied even when the two camera lenses have equal focal lengths. Thus if the camera lenses shown in Fig. 1 had their focal lengths NF and N'F' exactly equal, but their outside focal planes still separated as in the said figure, then the angle $a$ would be the same as illustrated and a varying-velocity gear would have to be used.

Supposing the lenses to be perfectly achromatic in all the forms shown, then either camera may be used as the auxiliary or eye camera. Thus in the camera of the drawing M' might be the exposing camera and M the eye camera. But if the exposing lens has a chemical focus it is the length of this chemical focus and the focal plane of chemical rays that should be plotted with the visual focal length and visual focal plane of the eye camera.

My invention is equally applicable where the auxiliary camera is replaced by a telescope which is, in this relation, nothing else but a camera with a short focus magnifier or eye piece to dispense with the ground glass. Thus in the drawing, supposing M' to be the exposing camera, the larger camera M could then be converted into a telescope, as indicated in Fig. 3, by simply mounting a telescopic eye piece E to the bottom of a box 4", the bottom being perforated to permit the rays of light to pass on through the eye piece, and the latter being adjusted so that it will show best a fine thread stretched in plane $p$ over the said perforation. The thread is represented in section as a dot $p'$, considerably exaggerated in size, for clearness.

In this case the image receiving plane of the eye camera, or telescope is that small, circular, and purely imaginary part of the structural plane $p$ which is situated directly opposite the magnifying eye-piece. This small imaginary image-receiving plane may itself be made structural, if desired, as explained in Note 3 below. Cementing a transparent glass plate on the inside of the previously marked common ground glass, as proposed by many, has the serious and apparently overlooked objection of virtually displacing the reticle plane to the right through a distance which is about equal to one-third of the thickness of the glass used.

The focuser seen in my Fig. 3 is, in fact, a 3-part telescope. It comprises three relatively movable optical elements respectively carried by three telescoping tubes, in order that the said three optical elements may be set in any desirable relative positions, exactly as in the common surveyor's telescope. The three optical elements are: first, the short focus eye lens; secondly, the test object or reticle $p'$; and, thirdly, the long focus object lens N.

Both eye lens and object lens are convergent, and in the present combination the tube that carries the eye lens is preferably threaded, to telescope by a long spiral motion, which facilitates the securing and holding of any desired adjustment.

Removing the reticle $p'$ leaves the combination fully operative as a viewing telescope, but renders it untrustworthy as a focuser, because the total extension of such a telescope varies with any variation that may take place in the eye sight of the observing eye.

Variations in eye sight will occur between different observers; or, with time, in the same observer; or, again, at short intervals, in the same observer if he has not lost his power of accommodation. A youthful observer, whose eye accommodates easily, might unconsciously and at short intervals, possibly, obtain very different, and, to him, equally satisfactory telescopic extensions, on the same object point.

The reticle $p'$ does away with all such uncertainties, because when the reticle is properly used, as hereinafter explained, the extension of the telescope, as measured from $p'$ to N, is solely dependent upon the distance of the object point, and is entirely independent of any variations in the eye sight of the observing eye, for these are entirely taken care of by adjusting the distance of the eye lens from the reticle plane $p'$.

The method of using my telescopic focuser, Fig. 3, is the same as that of using the well known phototheodolite of Paganini, and it may, therefore, be described in substantially the same terms, as follows:

"The observer while looking in the eye piece first moves it, in or out, with relation to the reticle $p'$ until he has found the position in which he sees the reticle $p'$ most distinctly; secondly, while still looking into the eye piece, he moves the eye piece and reticle together as a unit, in or out, with relation to the telescopic objective N, until he also sees most distinctly the image of the object to be focused upon; that is to say, he moves the eye piece and the reticle, as a whole, in or out, until he has brought the plane of the reticle into exact coincidence with the image of the object to be focused upon, and he finally verifies that such exact coincidence has been secured by noting that slight lateral displacements imparted to his eye no longer permit him to detect any parallax; that is to say, any displacement of the image with relation to the reticle." (Freely translated from the "*Rivista Marittima*," Roma, Marzo, 1894, page 344; copy at the Library of Congress.)

*On the varying velocity ratio.*

By "velocity ratio of the focusing gear" I really mean the ratio between the length of an infinitely small horizontal displacement of the lower pintle 7, to the corresponding, simultaneous, and infinitely small horizontal displacement of the upper pintle 7'.

The law connecting the angular displacements of a radial cam with and the corresponding linear displacements imparted by such cam to a horizontally moving pintle, is fully disclosed in Fig. 24 of my Case A, now Patent 1,178,474, issued April 4, 1916.

As explained in lines 2 to 11, page 12, of my said Case A, the line A'V' of the said Fig. 24, Case A, represents in actual size, the displacement of pintle H per radian of angular motion imparted to the radial cam, when said cam occupies the position A'H.

The radian contains 57.3 degrees, so that it is very nearly equal to two-thirds of a right angle; and, therefore, the practical meaning of the said Fig. 24 is that if the radial cam A'H is rotated, say clockwise, through the one millionth part of a radian, the pintle H will be moved horizontally to the left, through the one millionth part of the vertical length A'V'; and, similarly, if the radial cam A'J is rotated clockwise through the one millionth part of a radian, the pintle J will be moved horizontally to the left, through the one millionth part of the vertical length A'V''. If the radial arm A'J were made twice or any other number of times longer the distance A'V'' would evidently be increased in the same proportion, and, therefore, the principles of said Fig. 24 apply to any two radial cams rotating in constant angular relation to move pintles along paths that are offset as in the present Fig. 1.

In the present Fig. 1, therefore, the velocity ratio of pintles 7 and 7' may be determined, for any given position of the sector 10, by plotting the two points (such as V' and V'' in Fig. 24 of the said Case A) where the vertical line through the fulcrum point 9 is intersected first by the perpendicular drawn through the lower pintle 7 to the radius connecting such lower pintle 7 to the fulcrum point 9; secondly, by the perpendicular drawn through the upper pintle 7' to the radius connecting such upper pintle 7' to the same said fulcrum point 9.

It may thus be ascertained: (1) that the velocity ratio for the position shown in Fig. 1 is larger than unity; (2) that the velocity ratio is gradually increased, up to infinite value, by imparting clockwise rotation to the sector 10; (3) that the velocity ratio is gradually decreased, down to zero value, by imparting counter-clockwise rotation to the sector 10.

There must, therefore, be, at the right of the position seen in Fig. 1, a certain position of the sector 10 where the velocity ratio is exactly equal to unity.

If beta ($\beta$) be the known value of the sector angle, its unit-velocity-ratio position may be found as follows: Let H millimeters be the shortest distance of the fulcrum point 9 from the path of the lower pintle 7; let $h$ millimeters be the shortest distance of the same fulcrum point 9 from the path of the upper pintle 7'; and let the ratio of H to h be designated by $n^2$ so that we shall have in symbols $$n = \sqrt{H/h};$$

then, when the sector 10 is in its unit-velocity-ratio position, the upper pintle 7' is always situated to the right of the vertical through the fulcrum point 9, and its radial distance R' from center 9 is determined by the equation $$R' = \frac{h\sqrt{1+n^2-2.n.\cos\beta}}{\sin\beta}$$

The corresponding radial distance of the lower pintle 7 from the same center 9, is R equal to n times R'; but, as such left hand radius frequently is located to the left of the vertical through pivot 9, it is always better to begin by locating the upper pintle 7'.

If no error was made in the calculation the perpendicular at 7 to radius R, the perpendicular at 7' to radius R', and the vertical through pivot 9, should all three meet in one same point which is never situated higher than the path of the lower pintle.

The present Fig. 1 being geometrically correct in every particular, measurements may be made directly on the patent drawing, to calculate the unit-velocity-ratio position of sector 10, as follows: The sector angle beta ($\beta$) is about 24 degrees, with sine of 0.41, and cosine of 0.91. The ratio H/h or $n^2$ equals 1.96; and n, therefore, equals 1.4. The radius R' from 9 to 7' in the unit-velocity-ratio position of sector 10, may now be calculated as being very nearly equal to 16/10 of h; and this brings the upper pintle 7' very nearly into the present position of the rivet 6', and the lower pintle 7, very nearly into the present position of rivet 6. The unit-velocity-ratio position of sector 10 in the present Fig. 1 is structurally impossible.

The formula given above for calculating R' is general. When used in Fig. 2, where sine beta is nil (sin $\beta=0$) and where cosine beta is equal to unity (cos $\beta=1$), the formula yields.

$$R' = \frac{h(n-1)}{0}$$

that is to say, the constant velocity ratio lever of Fig. 2 has no unit-velocity-ratio position excepting when n equals one, for then we have $$R' = h\frac{0}{0}$$

where 0/0 is the sign of indetermination, indicating that any position of the lever is a unit-velocity-ratio position. The factor n, according to present disclosures, cannot be constant and uniformly equal to unity, for all positions of the camera parts, except in the very special case where the two focal lengths are equal to each other and the two objectives are relatively fixed so as to make the distance GG' equal to zero. The two internodal spaces, however large or small they may be, or however much they may differ, have no effect whatever on the value of the velocity ratio, except in so far as they may themselves indirectly have some influence in determining the values of the two focal lengths, or the value of the space GG'.

NOTE 1.—When the reticle plane consists in a ground glass face, and the eye lens is mounted in fixed relation thereto with an adjustment to permit of setting such lens sharply in focus on the said ground glass face, the combination may be considered as a poor form of telescope. It should, therefore, be distinctly understood that while I show and prefer the surveyor's open form of reticle, or the well known solid glass but transparent equivalent, my claim is worded in terms sufficiently general to include a ground glass reticle which is translucent only instead of being transparent.

NOTE 2.—Where the camera objective and the telescope objective are exactly similar in every respect, and are mounted in fixed relation so that the four cardinal planes of the one objective are at all times respectively coincident with extensions of the four cardinal planes of the other objective, then the reticle plane $p'$ of the telescope must evidently coincide, at all times, with an extension of the image receiving plane of the camera. That is to say, the image receiving plane of the camera and the image receiving plane $p'$ of the telescope are likewise relatively fixed, so that they must move together as rigidly connected parts of the same plane. The velocity ratio of such duplicate rigid connection is evidently equal to unity, exactly as in the well known "twin lens" camera; and, therefore, it should be understood that my present invention is not necessarily limited to combinations such as shown in the present Figs. 1 and 2, where the connecting mechanism has a velocity ratio that differs from unity in every, excepting possibly one certain, position of the camera parts.

NOTE 3.—The combination comprising Figs. 3 and 2, in view of disclosures made in my said Case Af or I', now Patent 1,178,478, is adjustable for use as a "theoretically accurate" focuser, capable of securing 3 and hence all-point correspondence with any one of different lenses, by means of the 3 adjustments disclosed in my said Case Af; and such combination, therefore, constitutes my present preferred form.

NOTE 4.—In the focusing gear of Fig. 1, there is as explained above, always one certain, theoretically assumable, though at times structurally impossible position of the focusing sector 10, in which the two infinitely small and simultaneous displacements of pins 7 and 7' are, or would be, exactly equal to each other. The focusing gear of Fig. 1 may, therefore, be referred to as focusing gear whose velocity ratio differs from unity in every, excepting possibly one certain, position of the camera parts; and this definition is sufficiently comprehensive in terms to include the constant velocity gear of Fig. 2.

What I claim as my invention and desire to secure by Letters Patent is:

1. A two-lens camera having its lenses mounted in a fixed relative position with their external principal focal planes parallel but non-coincident, and their image receiving planes movable with relation to each other; of a varying velocity ratio mechanism connecting said image receiving planes to cause them to move together so as to remain, at all times, in focus on the same object plane; said varying velocity ratio mechanism comprising two radial cams connected to rotate in a constant angular relation that differs from zero.

2. The combination with a photographic camera exclusively reserved for making exposures and comprising a support for the object lens, a support for the sensitized image receiving plane, and guides to permit of relatively moving said two supports, to place them in the proper relative position required to set the camera in focus on any one of differently distant object points situated in the camera field; of a second camera adjacently disposed with relation to the said first or exposing camera, and adapted to serve exclusively as a "focuser" for the said first or exposing camera; such adaptability being dependent upon the presence of the following elements, to wit: a support for the object lens in said second camera; a relatively movable support for the image receiving plane of said second camera; connections between the said two object lens supports of the combination; other connections between the said two image receiving plane supports of the combination; all of such connections being of such nature that the two cameras shall in any given relative position of their parts be simultaneously held in focus on some one common normal object plane of their two substantially coincident camera fields; said second or focuser camera being virtually transformed into a telescope by having (1) its image receiving plane both structurally and optically located, in relation to its corresponding support, by means of a finely textured optical test object or reticle which is adapted to permit rays of light coming from its corresponding objective lens to pass without diffusion on through the said image receiving or reticle plane, and through all parts situated back of said plane, in such manner as to afford a free view of the objective formed aerial conjugate point image of an object point to be focused on, even when such aerial conjugate point image is situated at an appreciable finite or parallax revealing distance from the said image receiving or reticle plane; (2) a magnifying eye piece mounted in the path of said transmitted rays, in fixed relation to such image receiving or reticle plane; and (3) means to permit of regulating the distance of the said magnifying eye piece from the said image receiving or reticle plane, as may be required to suit the eye sight of the observer.

3. The combination comprising: two adjacently disposed and mechanically connected focusing cameras, one of which is to be exclusively reserved as the exposing camera, while the other is to be exclusively used as a focuser for said exposing camera; said two cameras having objectives so related as to require (according to present disclosures) a connecting mechanism whose velocity ratio differs from unity in every, excepting possibly one certain position of the camera parts; the one of the said two cameras which is exclusively reserved as a focuser being virtually transformed into a telescope by having: (1) its image receiving plane located in relation to its corresponding support, by means of a finely textured optical test object or reticle which is adapted to permit rays of light coming from its corresponding objective, to pass on through the said image receiving or reticle plane, and through all parts situated back of said plane; (2) a magnifying eye-piece mounted in the path of said transmitted rays, in fixed relation to such image receiving or reticle plane; and (3) means to permit of regulating the distance of the said magnifying eye-piece from the said image receiving or reticle plane, as may be required to suit the eye sight of the observer.

4. The combination comprising two adjacently disposed and mechanically connected focusing cameras, one of which is to be exclusively reserved as the exposing camera, while the other is to be exclusively used as a focuser for said exposing camera, said two cameras having their two separate objectives mounted in a fixed relative position, and their two relatively movable image receiving planes respectively controlled by mechanically connected radial cams; the one of the said two cameras which is exclusively reserved as a focuser being virtually transformed into a telescope by having: (1) its image receiving plane both structurally and optically located, in relation to its corresponding support, by means of a finely textured optical test object or reticle which is adapted to permit rays of light, coming from its corresponding objective, to pass without diffusion through the said image receiving or reticle plane, and through all parts situated back of said plane, so as to afford a free view of the objective formed aerial conjugate point image of an object point to be focused on, even when such aerial conjugate point image is in an out of focus or parallax revealing position; (2) a magnifying eyepiece mounted in the path of said transmitted rays, in fixed relation to such image receiving or reticle plane; and (3) means to permit of regulating the distance of the said magnifying eyepiece from the said image receiving or reticle plane, as may be required to suit the eyesight of the observer.

In testimony whereof, I have signed my name to this specification.

JOSEPH BECKER.